(12) United States Patent
Nakai (10) Patent No.: US 10,477,155 B2
(45) Date of Patent: Nov. 12, 2019

(54) DRIVING ASSISTANCE METHOD, DRIVING ASSISTANCE DEVICE, AND RECORDING MEDIUM RECORDING PROGRAM USING SAME

(71) Applicant: Panasonic Intellectual Property Management Co., Ltd., Osaka (JP)

(72) Inventor: Wataru Nakai, Tokyo (JP)

(73) Assignee: PANASONIC INTELELCTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/753,564

(22) PCT Filed: Sep. 1, 2016

(86) PCT No.: PCT/JP2016/003995
§ 371 (c)(1),
(2) Date: Feb. 20, 2018

(87) PCT Pub. No.: WO2017/043056
PCT Pub. Date: Mar. 16, 2017

(65) Prior Publication Data
US 2018/0241970 A1 Aug. 23, 2018

(30) Foreign Application Priority Data
Sep. 7, 2015 (JP) .................. 2016-176155

(51) Int. Cl.
*H04N 7/00* (2011.01)
*H04N 7/18* (2006.01)
*G08G 1/16* (2006.01)
*H04N 5/268* (2006.01)
*B60W 30/00* (2006.01)

(52) U.S. Cl.
CPC .............. *H04N 7/18* (2013.01); *B60W 30/00* (2013.01); *G08G 1/166* (2013.01); *H04N 5/268* (2013.01)

(58) Field of Classification Search
CPC .......... H04N 7/18; H04N 5/268; B60W 30/00
See application file for complete search history.

(56) References Cited

U.S. PATENT DOCUMENTS

2013/0226390 A1* 8/2013 Luo .................. B60D 1/36
701/25

FOREIGN PATENT DOCUMENTS

| JP | 2009-122808 | | 6/2009 |
| JP | 2009122808 | A * | 6/2009 |
| JP | 2014-006776 | | 1/2014 |

OTHER PUBLICATIONS

International Search Report of PCT application No. PCT/JP2016/003995 dated Nov. 8, 2016.

* cited by examiner

Primary Examiner — Sath V Perungavoor
Assistant Examiner — Peet Dhillon
(74) Attorney, Agent, or Firm — Seed IP Law Group LLP (57) ABSTRACT

A monitoring target management unit specifies a monitoring target based on vehicle peripheral information acquired from a vehicle exterior image sensor mounted on a vehicle. A display controller highlights the monitoring target specified by the monitoring target management unit. An operation signal input unit receives a user input for updating the monitoring target specified by the monitoring target management unit. The monitoring target management unit updates a monitoring target when the operation signal input unit receives a user input.

7 Claims, 9 Drawing Sheets

DRIVING ASSISTANCE METHOD, DRIVING ASSISTANCE DEVICE, AND RECORDING MEDIUM RECORDING PROGRAM USING SAME

This application is a U.S. national stage application of the PCT International Application No. PCT/JP2016/003995 filed on Sep. 1, 2016, which claims the benefit of foreign priority of Japanese patent application No. 2015-176155 filed on Sep. 7, 2015, the contents all of which are incorporated herein by reference.

TECHNICAL FIELD

The present invention relates to a driving assistance technique and, more particular, to a driving assistance method of assisting control on a target to be monitored by a driver and a driving assistance device using the method.

BACKGROUND ART

A camera mounted on a vehicle monitors objects existing around the vehicle. There are demands for implementation of notification display suitable for a driver in accordance with a monitoring result. For this reason, when a plurality of objects including an object existing in a monitoring area are detected, a display device displays objects upon limiting a number of objects to be displayed to a number equal to or less than an upper limit of the number of objects to be displayed. On the other hand, when only objects existing outside the monitoring area are detected, the display device displays objects while display of the number of objects larger than the upper limit is allowed (see, for example, PTL 1).

CITATION LIST

Patent Literature

PTL 1: Unexamined Japanese Patent Publication No. 2014-6776

SUMMARY OF THE INVENTION

It is an object of the present invention to provide a technique for setting a monitoring target reflecting a will of a driver.

A driving assistance device according to an aspect of the present invention includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit updates a monitoring target when the input unit receives a user input.

Another aspect of the present invention also relates to a driving assistance device. This device includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit adds a monitoring target when the input unit receives a user input.

Still another aspect of the present invention also relates to a driving assistance device. This device includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit deletes a monitoring target when the input unit receives a user input.

Still another aspect of the present invention also relates to a driving assistance method. This method includes a step of specifying a monitoring target based on vehicle peripheral information acquired by a sensor mounted on a vehicle, a step of highlighting the specified monitoring target, a step of receiving a user input for updating the specified monitoring target, and a step of updating the monitoring target upon reception of the user input.

Note that arbitrary combinations of above constituent elements and any conversions of expressions of the present invention made among devices, systems, methods, programs, recording media recording programs, vehicles equipped with the devices, and the like are also effective as aspects of the present invention.

According to the present invention, it is possible to set a monitoring target reflecting a will of the driver.

DESCRIPTION OF EMBODIMENTS

A problem in a conventional device will be briefly described prior to a description of an exemplary embodiment of the present invention. Automatically setting a monitoring area is convenient for a driver but may lead to failure in detecting an object that should be noticed by the driver or may lead to detection of an unnecessary object. Accordingly, a monitoring function cannot be sufficiently exhibited.

(First Exemplary Embodiment)

An exemplary embodiment of the present invention relates to a driving assistance device that displays a monitoring target in an image captured by a vehicle exterior image sensor mounted on a vehicle. In a case where a vehicle executes an automatic steering mode, and a driving assistance device automatically detects a monitoring target, a driver just keeps monitoring, and hence falls in monotony. In addition, a monitoring target that is automatically detected can be insufficient or unnecessary for the driver. If the driver cannot update a monitoring target in such a situation, he/she needs to perform monitoring by himself/herself while falling in monotony. On the other hand, even if the driver can update a monitoring target, cumbersome update processing will reduce convenience for the driver. There are demands for a technique of setting a monitoring target reflecting a will of the driver while improving convenience for the driver.

In order to meet such demands, a driving assistance device according to this exemplary embodiment displays an image captured by a vehicle external image sensor on a display device having a touch panel and also highlights a monitoring target in the image. In such a situation, upon finding a failure to detect a monitoring target, false detection, or an object to be additionally monitored, the driver directly touches the display device to make the driving assistance device add or delete a monitoring target.

Figure 1:
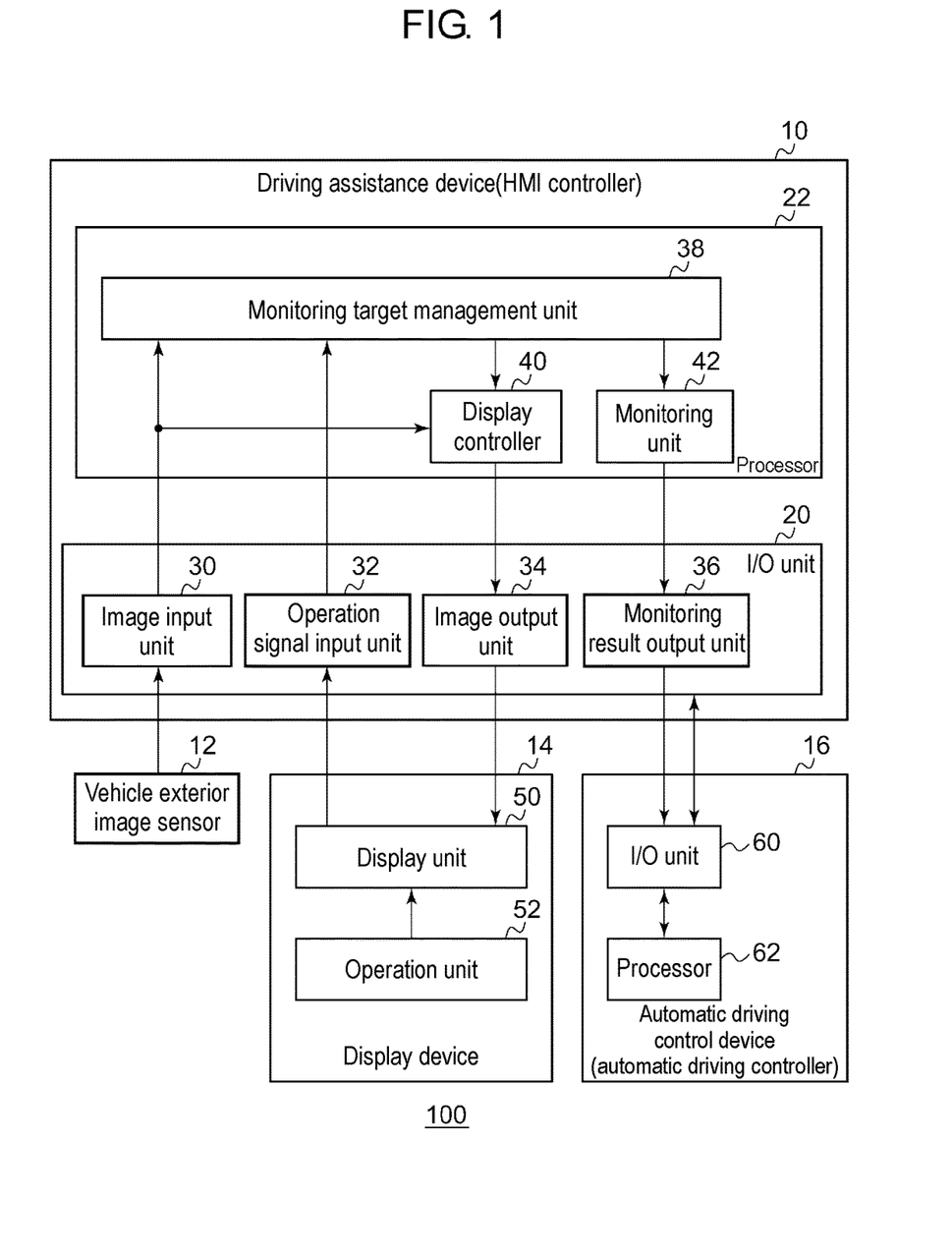
FIG. 1 is a diagram showing a configuration of a vehicle according to a first exemplary embodiment of the present invention.

FIG. 1 shows a configuration of vehicle 100 according to a first exemplary embodiment of the present invention. Vehicle 100 includes driving assistance device 10, vehicle exterior image sensor 12, display device 14, and automatic driving control device 16. Driving assistance device 10 includes input/output (I/O) unit 20 and processor 22. I/O unit 20 includes image input unit 30, operation signal input unit 32, image output unit 34, and monitoring result output unit 36. Processor 22 includes monitoring target management unit 38, display controller 40, and monitoring unit 42. Display device 14 includes display unit 50 and operation unit 52. Automatic driving control device 16 includes I/O unit 60 and processor 62.

Vehicle exterior image sensor 12 is an image capturing unit that is attached to a back of a room mirror of vehicle 100 to perform image capturing from front to sides of vehicle 100. An image captured by vehicle exterior image sensor 12 can be regarded as vehicle peripheral information. A known technique can be used as vehicle exterior image sensor 12, and hence a description of the sensor will be omitted. An image captured by vehicle exterior image sensor 12 is a moving image. Note that as an image, each of still images constituting a moving image can be applied. Driving assistance device 10 is connected to vehicle exterior image sensor 12 via wired communication using a dedicated line, universal serial bus (USB), Ethernet (registered trademark, ditto hereinafter), controller area network (CAN), or the like. For this reason, vehicle exterior image sensor 12 outputs a captured image to driving assistance device 10.

Display device 14 may be a car navigation system, a head unit such as a display audio system, a portable terminal device such as a smartphone or tablet, or a dedicated console terminal device. Display unit 50 is a liquid crystal display or electroluminescence (EL) display. Operation unit 52 is a user interface for receiving an input from the driver. Display unit 50 and operation unit 52 may be an integrated touch panel display. Note that operation unit 52 may include an input device for assisting gesture input, such as a mouse, stylus pen, or trackball. In addition, a pen that emits visible light or infrared light may be used. Furthermore, display unit 50 and operation unit 52 may not be an integrated touch panel display and may be physically discrete components.

Driving assistance device 10 is connected to display device 14 via wired communication using a dedicated line, CAN, or the like or via wired communication or wireless communication using a USB, Ethernet, Wi-Fi (registered trademark, ditto hereinafter), Bluetooth (registered trademark, ditto hereinafter), or the like.

Automatic driving control device 16 is an automatic driving controller equipped with an automatic driving control function. A configuration of processor 62 can be implemented by cooperation between hardware resources and software resources or only hardware resources. Hardware resources that can be used include a read only memory (ROM), random access memory (RAM), and other large scale integrated circuits (LSIs). Software resources that can be used include programs such as an operating system, applications, and firmware. I/O unit 60 executes various types of communication control corresponding to various types of communication formats.

Driving assistance device 10 is a human machine interface (HMI) controller for executing an interface function between vehicle 100 and the driver. Processor 22 can be implemented by cooperation between hardware resources and software resources or only hardware resources. Hardware resources that can be used include a ROM, RAM, and other LSIs. Software resources that can be used include programs such as an operating system, applications, and firmware. I/O unit 20 executes various types of communication control corresponding to various types of communication formats. Driving assistance device 10 is directly connected to automatic driving control device 16 via a signal wire. Note that these devices may be connected to each other via a CAN. In addition, driving assistance device 10 and automatic driving control device 16 may be integrated into one controller.

The following will describe how a monitoring target is set in the above configuration. A monitoring target is set by (1) monitoring target automatic detection and (2) monitoring target updating. First, (1) monitoring target automatic detection will be described. Vehicle exterior image sensor 12 outputs a captured image to image input unit 30. Image input unit 30 receives the image from vehicle exterior image sensor 12. Image input unit 30 outputs the image to monitoring target management unit 38 and display controller 40.

Monitoring target management unit 38 receives the image from image input unit 30. Monitoring target management unit 38 detects and specifies a monitoring target from the image. A monitoring target in this case is disposed on the image and can be regarded as a two-dimensional existence area. Monitoring target management unit 38 executes object detection in two stages of processing. First of all, monitoring target management unit 38 extracts feature amounts such as Haar-like, local binary pattern (LBP), and histograms of oriented gradients (HOG) from the image. Monitoring target management unit 38 then extracts an object to be set as a monitoring target by identifying the extracted feature amounts using an identifying device such as AdaBoost or support vector machine (SVM).

If the extracted object is not being tracked, monitoring target management unit 38 adds the extracted object as a monitoring target, and starts tracking In this case, a case of not tracking an extracted object is equivalent to a case in which the existence area of the extracted object differs from the areas of all monitoring targets that have already been tracked by a predetermined value or more. In addition, a case of not tracking an extracted object may be equivalent to a case in which central coordinates of the existence area of the extracted object differs from the central coordinates of the areas of all monitoring targets that have already been tracked by a predetermined value or more. In these cases, the predetermined values may be determined in advance.

When tracking starts, monitoring target management unit 38 uses an image (to be referred to as a "first image" hereinafter) in which a monitoring target has already been specified and specifies a monitoring target in an image (to be referred to as a "second image" hereinafter) captured after the first image. More specifically, monitoring target management unit 38 searches the second image for a monitoring target by preferentially searching near coordinates at which a monitoring target exists in the first image. On the other hand, when the monitoring target disappears from the image, monitoring target management unit 38 finishes tracking the monitoring target. When the tracking finishes, monitoring target management unit 38 deletes the corresponding object as a monitoring target. Monitoring target management unit 38 outputs information concerning a monitoring target in each image to display controller 40 and monitoring unit 42.

Display controller 40 receives an image from image input unit 30, and also receives information concerning a monitoring target from monitoring target management unit 38. In this case, the information concerning the monitoring target includes, for example, central coordinates and size of an existence area including the monitoring target in the image. Display controller 40 generates a display image by superimposing a graphic frame form (to be referred to as a "monitoring target frame" hereinafter) indicating an existence area including a monitoring target on an image. When a plurality of monitoring targets are included in an existence area, a plurality of monitoring target frames are displayed in an image. Display controller 40 outputs the display image to image output unit 34, and image output unit 34 outputs the display image to display unit 50. Display unit 50 displays the display image input from image output unit 34. That is, display controller 40 causes display unit 50 to highlight a monitoring target specified by monitoring target management unit 38.

Monitoring unit 42 receives information concerning a monitoring target from monitoring target management unit 38. Monitoring unit 42 executes monitoring of the monitoring target. Note that when there are a plurality of monitoring targets, monitoring unit 42 executes monitoring of each monitoring target. Monitoring is, for example, processing of sequentially measuring a distance between vehicle 100 and a monitoring target to prevent collision between them. For this purpose, monitoring unit 42 measures a distance between the monitoring target specified by monitoring target management unit 38 and vehicle 100. In this case, monitoring unit 42 may measure a distance from an image input to image input unit 30 or may measure a distance by using a distance sensor (not shown). A known technique may be used to measure such a distance, and hence a description of the technique will be omitted. Monitoring unit 42 outputs a distance to each monitoring target as a monitoring result to monitoring result output unit 36.

Monitoring result output unit 36 outputs a monitoring result obtained by monitoring unit 42 to automatic driving control device 16. Processor 62 of automatic driving control device 16 receives the monitoring result from monitoring result output unit 36 via I/O unit 60. Processor 62 reflects a distance indicated by a monitoring result in automatic driving. If, for example, the distance is smaller than a threshold, processor 62 stops vehicle 100.

Next, (2) Monitoring target updating will be described. Monitoring target updating includes addition and deletion of a monitoring target. The following description is based on the assumption that a display image is displayed on display unit 50. The driver checks a monitoring target frame in the display image displayed on display unit 50. When wanting to update a monitoring target frame, the driver touches the touch panel of display device 14. This action is equivalent to that the driver operates operation unit 52. That is, operation unit 52 receives a user input for updating a monitoring target frame displayed on display unit 50. The user input for updating the monitoring target frame displayed on display unit 50 is also a user input for updating a monitoring target specified by monitoring target management unit 38. At this time, the user input received by operation unit 52 is input to operation signal input unit 32 via display unit 50.

Operation signal input unit 32 receives the user input that is input by the driver to operation unit 52, and outputs the user input to monitoring target management unit 38. Monitoring target management unit 38 receives the user input from operation signal input unit 32. Monitoring target management unit 38 acquires coordinates selected by the user input on display unit 50. If the user input corresponds to an operation of drawing a predetermined pattern instead of selecting one or more points on display unit 50, monitoring target management unit 38 acquires a combination of coordinates corresponding to the pattern.

A case in which "selected coordinates" are acquired will be described first, and a case in which "a combination of coordinates corresponding to the pattern" is acquired will be described next. Upon acquiring "selected coordinates", monitoring target management unit 38 compares the selected coordinates with coordinates of the monitoring target frame. Note that if a plurality of monitoring target frames are provided, the selected coordinates are compared with coordinates of all the monitoring target frames. That is, monitoring target management unit 38 determines whether a position selected by a user input is located outside or inside a monitoring target frame.

If the selected position is located outside the monitoring target frame, monitoring target management unit 38 adds the target indicated by the user input as a monitoring target. More specifically, if an object has been detected at the coordinates selected by the user input by the above object detection, monitoring target management unit 38 adds the detected object as a monitoring target. In addition, monitoring target management unit 38 may add, as a monitoring target, an area having a predetermined size centered on coordinates selected by a user input. Note that in the former case, tracking is started in the same manner as described above, whereas in the latter case, even when tracking is started, a position of a monitoring target is fixed. This processing can be regarded as processing of, upon receiving a user input corresponding to a different target from a monitoring target frame highlighted by display controller 40 and also corresponding to a target displayed on display unit 50, adding the object indicated by the user input as a monitoring target.

Figure 2A:
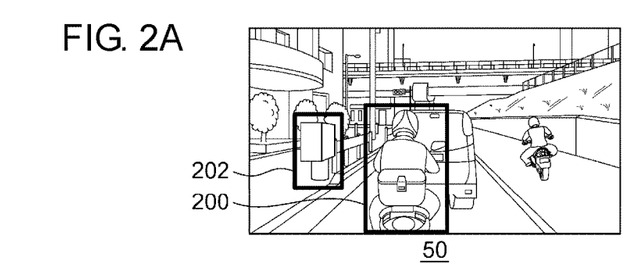
FIG. 2A is a view showing an image displayed on a display unit in FIG. 1.
Figure 2B:
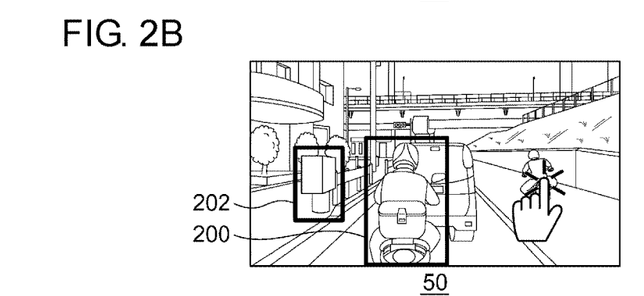
FIG. 2B is a view showing an image displayed on the display unit in FIG. 1.
Figure 2C:
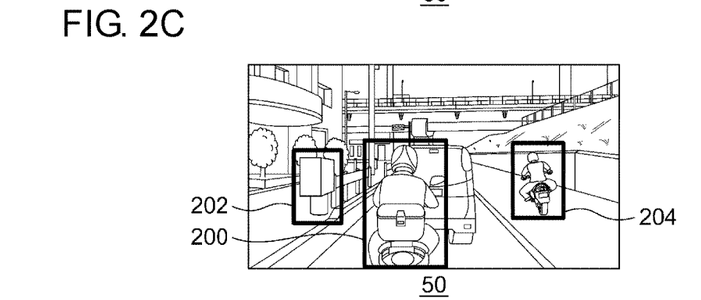
FIG. 2C is a view showing an image displayed on the display unit in FIG. 1.
Figure 2D:
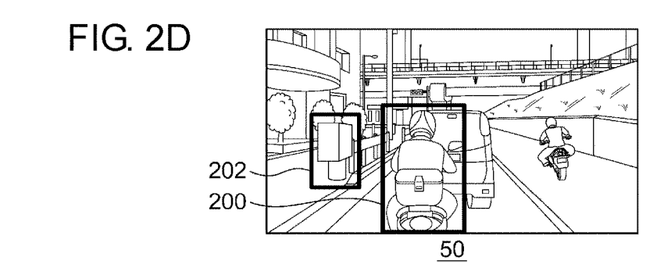
FIG. 2D is a view showing an image displayed on the display unit in FIG. 1.
Figure 2E:
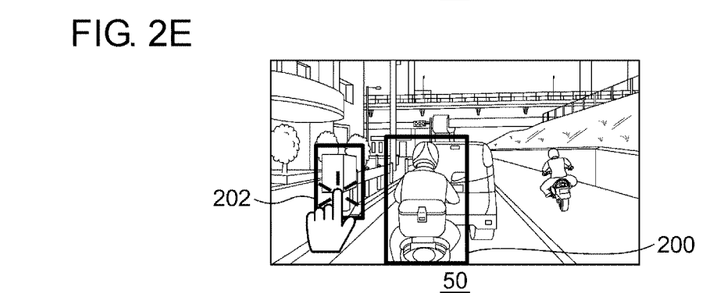
FIG. 2E is a view showing an image displayed on the display unit in FIG. 1.
Figure 2F:
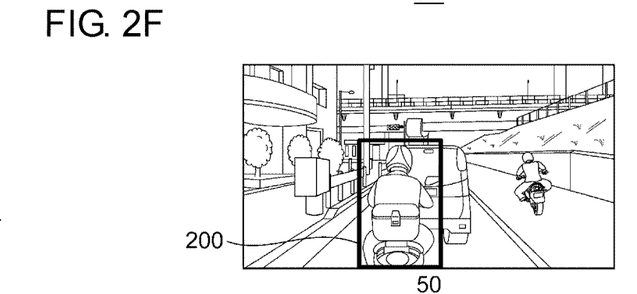
FIG. 2F is a view showing an image displayed on the display unit in FIG. 1.

FIGS. 2A to 2F show images displayed on display unit 50. Referring to FIG. 2A, first monitoring target frame 200 and second monitoring target frame 202 are highlighted as monitoring targets. Referring to FIG. 2B, a driver touches a target other than first monitoring target frame 200 and second monitoring target frame 202. This action is equivalent to that operation unit 52 receives a user input. Referring to FIG. 2C, in addition to first monitoring target frame 200 and second monitoring target frame 202, third monitoring target frame 204 selected by a user input is highlighted. FIGS. 2D to 2F will be described later. Refer back to FIG. 1.

In contrast to the above, if a selected position is located inside a monitoring target frame, monitoring target management unit 38 deletes the monitoring target. That is, upon receiving a user input corresponding to a monitoring target highlighted by display controller 40, monitoring target management unit 38 deletes the monitoring target. In this case, monitoring target management unit 38 also finishes tracking with respect to the deleted monitoring target. FIG. 2D shows the same display image as the display image shown in FIG. 2A. Referring to FIG. 2E, the driver touches second monitoring target frame 202. This action is equivalent to that operation unit 52 receives a user input. Referring to FIG. 2F, only first monitoring target frame 200 is kept highlighted, while second monitoring target frame 202 ceases to be highlighted. Refer back to FIG. 1. As described above, when the input unit receives a user input, monitoring target management unit 38 updates a monitoring target.

Upon acquiring "a combination of coordinates corresponding to a pattern", monitoring target management unit 38 specifies a shape of a pattern corresponding to the coordinate combination. Meanwhile, monitoring target management unit 38 determines, in advance, a shape of a pattern to add a monitoring target and a shape of a pattern to delete a monitoring target. If the specified shape of the pattern is the shape of the pattern determined in advance to add a monitoring target, monitoring target management unit 38 adds the object indicated by the shape of the pattern as a monitoring target.

More specifically, if a shape of a pattern determined in advance to add a monitoring target is a rectangular frame, an object surrounded by the shape of the frame or an area indicated by the shape of the frame is added as a monitoring target. Note that a shape of a pattern determined in advance to add a monitoring target is not limited to a rectangular frame and may be another shape such as a circular frame. In addition, monitoring target management unit 38 starts tracking the added monitoring target in the same manner as described above. This processing can be regarded as processing of adding a monitoring target upon receiving a user input determined in advance to add a monitoring target and corresponding to a target displayed on display unit 50.

If a specified shape of a pattern is a shape of a pattern determined in advance to delete a monitoring target, monitoring target management unit 38 deletes the object, as a monitoring target, indicated by the shape of the pattern. More specifically, if a shape of a pattern determined in advance to add a monitoring target is determined by swiping, an object indicated by a rectangle circumscribed by a line segment drawn by swiping or a circle is deleted as a monitoring target. Note that a shape of a pattern determined in advance to delete a monitoring target is not limited to a shape drawn by swiping. In addition, monitoring target management unit 38 finishes tracking the deleted monitoring target. This processing can be regarded as processing of deleting a monitoring target upon receiving a user input determined in advance to delete a monitoring target.

Monitoring target management unit 38 may update a criterion for specifying a monitoring target in accordance with a received user input. That is, upon detecting an object similar to a monitoring target added in accordance with a user input in a new image, monitoring target management unit 38 re-learns to specify the added object as a monitoring target. In addition, upon detecting an object similar to a monitoring target deleted in accordance with a user input in a new image, monitoring target management unit 38 re-learns not to specify the deleted object as a monitoring target.

Figure 3:
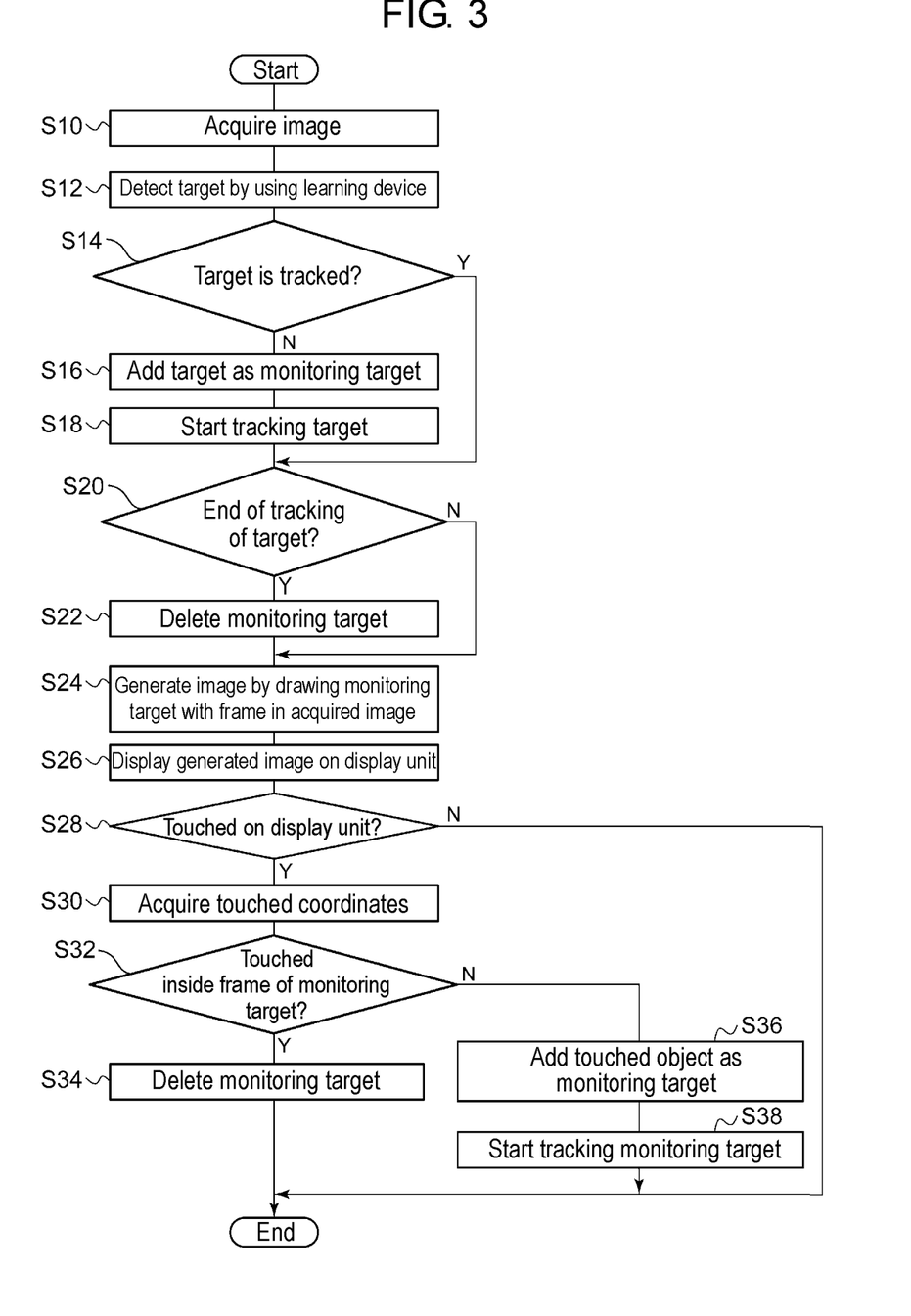
FIG. 3 is a flowchart showing a processing procedure for a monitoring target by a driving assistance device in FIG. 1.

An operation of driving assistance device 10 having the above configuration will be described. FIG. 3 is a flowchart showing a processing procedure for a monitoring target by driving assistance device 10. Image input unit 30 acquires an image (S10). Monitoring target management unit 38 detects a target by using a learning device (S12). If the target is not tracked (N in S14), monitoring target management unit 38 adds the target as a monitoring target (S16), and starts tracking the target (S18). In contrast, if the target is tracked (Y in S14), the process skips steps 16 and 18. If tracking of the target is finished (Y in S20), monitoring target management unit 38 deletes the monitoring target (S22). In contrast, if tracking of the target is not finished (N in S20), the process skips step 22.

Display controller 40 generates an image by drawing a frame around a monitoring target in the acquired image (S24). Display controller 40 causes display unit 50 to display the generated image (S26). When display unit 50 is touched (Y in S28), monitoring target management unit 38 acquires touched coordinates (S30). If the inside of a frame of a monitoring target is touched (Y in S32), monitoring target management unit 38 deletes the monitoring target (S34). If an object outside the frame of the monitoring target is touched (N in S32), monitoring target management unit 38 adds the touched object as a monitoring target (S36). Monitoring target management unit 38 starts tracking the monitoring target (S38). In contrast, if display unit 50 is not touched (N in S28), the process skips steps 30 through 38.

According to this exemplary embodiment, it is possible to set a monitoring target reflecting a will of the driver because a monitoring target is specified based on vehicle peripheral information acquired from the vehicle exterior image sensor and a monitoring target is updated when a user input for updating a monitoring target is received with respect to a highlighted monitoring target. In addition, because a monitoring target is added for updating the monitoring target, it is possible to set a monitoring target reflecting a will of the driver. Upon receiving a user input with respect to a different target from a highlighted monitoring target frame, the monitoring target management unit adds a monitoring target. This makes it possible to clearly input a driver's will to add. Upon receiving a user input with respect to a target displayed on the display unit, the monitoring target management unit adds a monitoring target. This makes it possible to easily issue an instruction. Upon receiving a user input of a predetermined pattern to add a monitoring target, the monitoring target management unit adds a monitoring target. This makes it possible to clearly input a will of the driver. In addition, upon receiving a user input of a pattern with respect to a target displayed on the display unit, the monitoring target management unit adds a monitoring target. This makes it possible to easily issue an instruction.

Because a monitoring target is deleted for updating the monitoring target, it is possible to set a monitoring target reflecting a will of the driver. Upon receiving a user input with respect to a highlighted monitoring target frame, the monitoring target management unit deletes a monitoring target. This makes it possible to clearly input a will of the driver. Upon receiving a user input of a pattern determined in advance to delete a monitoring target, the monitoring target management unit deletes the monitoring target. This makes it possible to clearly input a will of the driver. Because re-learning is executed, accuracy in specifying a monitoring target can be improved. The driver not only keeps monitoring a behavior and surroundings of a system but also executes an operation for selecting/canceling an object that the driver should or should not notice by "himself/herself". This can make it difficult for the driver to fall in monotony. In addition, it is possible to reduce failures to detect monitoring targets and false detection and perform peripheral detection reflecting a sense of the driver which is mechanically difficult to detect. This allows the driver to perform a more preferable driving operation.

(Second Exemplary Embodiment)

The second exemplary embodiment will be described next. Similar to the first exemplary embodiment, the second exemplary embodiment relates to a driving assistance device that displays a monitoring target. In the first exemplary embodiment, when a driver directly touches the display device, the driving assistance device updates a monitoring target. In contrast to this, the second exemplary embodiment is based on the assumption that augmented reality (AR) display is performed by using a head-up display (HUD), and is configured to update a monitoring target based on a gesture by a driver. The following will mainly describe differences from the above description.

Figure 4:
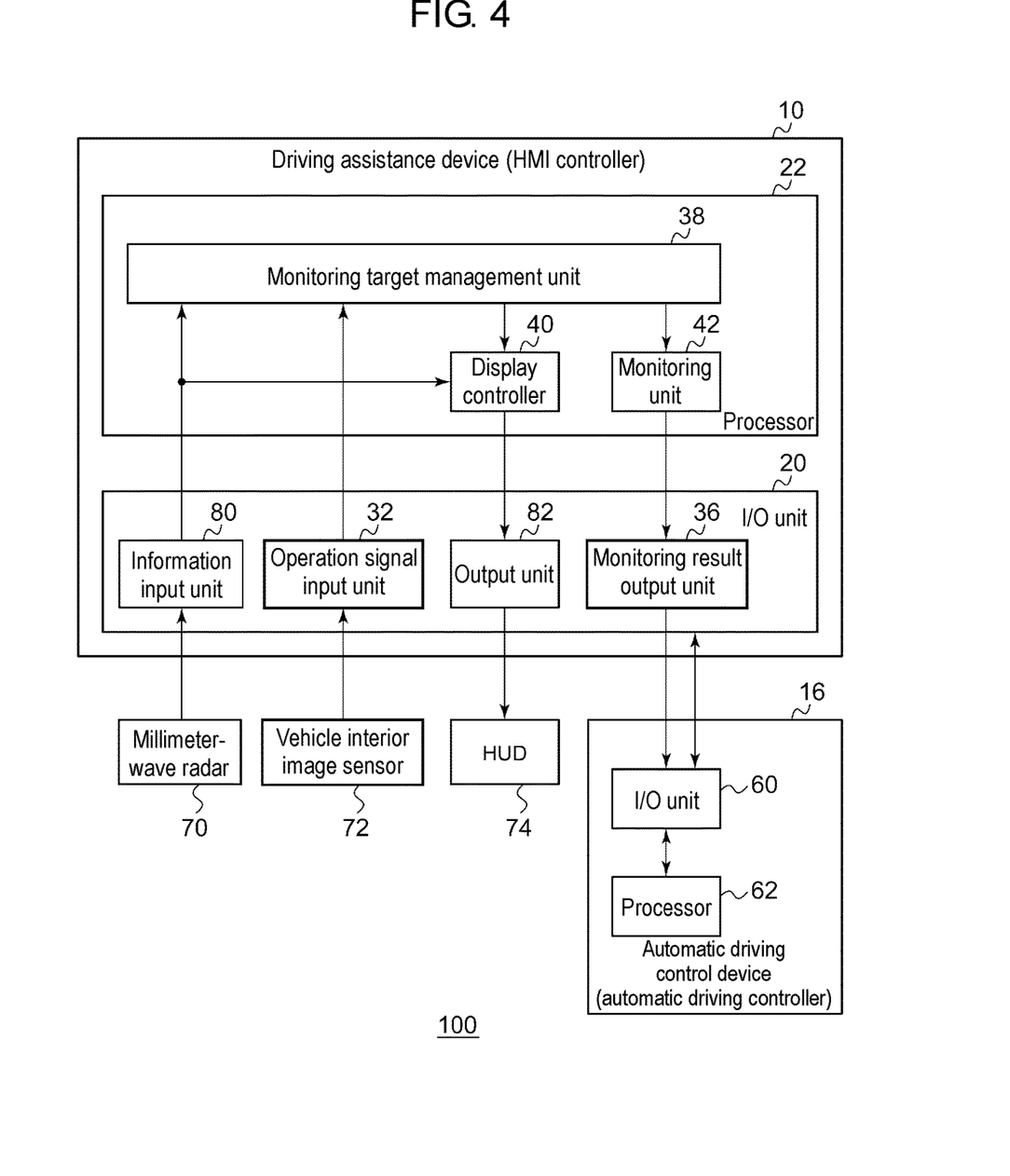
FIG. 4 is a diagram showing a configuration of a vehicle according to a second exemplary embodiment of the present invention.

FIG. 4 shows a configuration of vehicle 100 according to the second exemplary embodiment of the present invention. Vehicle 100 includes driving assistance device 10, automatic driving control device 16, millimeter-wave radar 70, vehicle interior image sensor 72, and HUD 74. Driving assistance device 10 includes I/O unit 20 and processor 22. I/O unit 20 includes operation signal input unit 32, monitoring result output unit 36, information input unit 80, and output unit 82. Processor 22 includes monitoring target management unit 38, display controller 40, and monitoring unit 42. Automatic driving control device 16 includes I/O unit 60 and processor 62.

Millimeter-wave radar 70 can detect a situation in a range of 100 m by using radio waves in a millimeter-wave band. Millimeter-wave radar 70 includes a distance measurement function of measuring a distance to an object in front of the radar and a velocity measurement function of measuring a velocity relative to an object in front of the radar. Driving assistance device 10 is connected to millimeter-wave radar 70 via wired communication using a dedicated line, USB, Ethernet, CAN, or the like. Accordingly, millimeter-wave radar 70 outputs, to information input unit 80, information (vehicle peripheral information) concerning a distance to an object and a direction in which the object exists.

Vehicle interior image sensor 72 is an image capturing unit identical to vehicle exterior image sensor 12 and is installed to be able to capture an image of a driver in the vehicle. An image captured by vehicle interior image sensor 72 is a moving image. Note that as described above, images may be a plurality of still images constituting a moving image. Driving assistance device 10 is connected to vehicle interior image sensor 72 via wired communication using a dedicated line, USB, Ethernet, CAN, or the like. Accordingly, vehicle interior image sensor 72 outputs a captured image to driving assistance device 10.

HUD 74 is means for directly projecting information in a human's visual field, and projects an image on a transparent optical glass element. HUD 74 includes a compact display constituted by a liquid crystal display (LCD), liquid crystal on silicon (LCOS), holographic optical element, and the like to project an image. Driving assistance device 10 may be connected to HUD 74 via wired communication using a dedicated line, CAN, or the like or via wired or wireless communication using a USB, Ethernet, Wi-Fi, Bluetooth, or the like.

The following will describe how a monitoring target is set in the above configuration. A monitoring target is set by (1) monitoring target automatic detection and (2) monitoring target updating. First, (1) monitoring target automatic detection will be described. Upon receiving information from millimeter-wave radar 70, information input unit 80 outputs the information to monitoring target management unit 38. In addition, upon receiving an image of the driver which is captured by vehicle interior image sensor 72, operation signal input unit 32 outputs the image to monitoring target management unit 38.

Monitoring target management unit 38 receives the information from information input unit 80 and also receives the image from operation signal input unit 32. Monitoring target management unit 38 detects and specifies a monitoring target from the information. The monitoring target in this case is disposed in a real space and can be regarded as a three-dimensional existence area. Monitoring target management unit 38 detects an object by the same processing as processing for an image. In addition, monitoring target management unit 38 starts tracking by adding a monitoring target or finishes tracking by excluding a monitoring target from information in the same manner as described above. Monitoring target management unit 38 further specifies an eye position of a driver based on the image. An eye position may be specified by executing the same processing as object detection processing for an image described above. Monitoring target management unit 38 outputs information concerning the monitoring target to display controller 40 and monitoring unit 42, and outputs information concerning the eye position to display controller 40.

Display controller 40 receives the information concerning the monitoring target and the information concerning the eye position from monitoring target management unit 38. In this case, the information concerning the monitoring target includes, for example, a position of an existence area including the monitoring target and a size of the existence area. Display controller 40 generates a graphic frame form (to be referred to as a "monitoring target frame" hereinafter) surrounding the monitoring target on an axis connecting the eye position and the position of the existence area including the monitoring target. A monitoring target frame indicates an existence area including a monitoring target. When a plurality of monitoring targets are included in an image, a plurality of monitoring target frames are generated. Display controller 40 outputs a display image including one or more monitoring target frames to output unit 82. Output unit 82 outputs the display image to HUD 74. HUD 74 projects the display image input from output unit 82 as a virtual image. With this operation, display controller 40 causes HUD 74 to highlight a monitoring target specified by monitoring target management unit 38.

Figure 5:
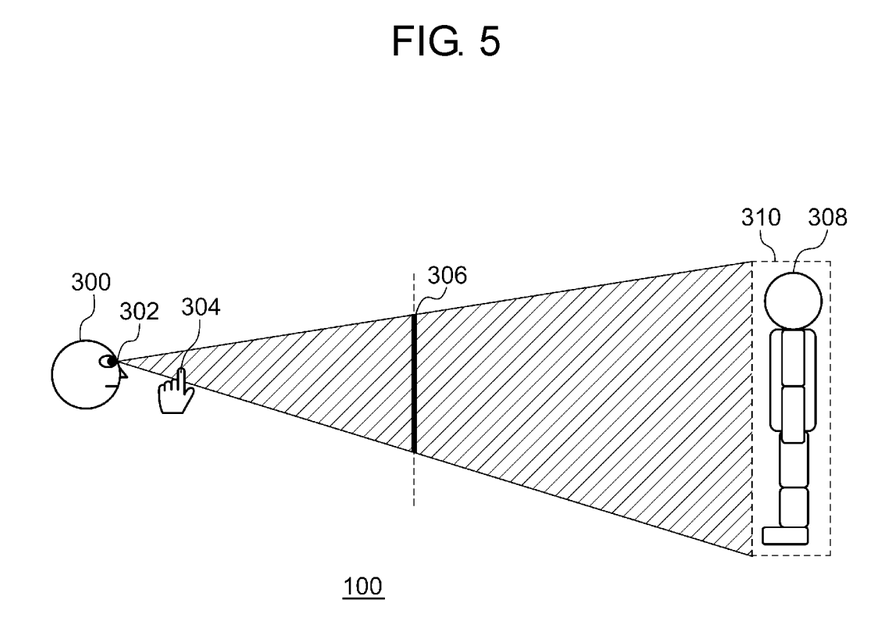
FIG. 5 is a view showing an outline of processing in the vehicle in FIG. 4.

FIG. 5 shows an outline of processing in vehicle 100. In this case, the right side of FIG. 5 indicates a traveling direction of vehicle 100, and driver 300 faces the traveling direction. Target object 308 exists ahead of a field of view from eye 302 of driver 300. In this case, target object 308 exists outside vehicle 100. HUD 74 (not shown) forms virtual image 306 between eye 302 and target object 308. Although virtual image 306 includes the above monitoring target frame, driver 300 sees the monitoring target frame as monitoring target frame 310 surrounding target object 308. Refer back to FIG. 4. Monitoring unit 42 and automatic driving control device 16 perform the same processing as described above with respect to a monitoring target, and hence a description of the processing will be omitted.

Next, (2) Monitoring target updating will be described. Monitoring target updating includes addition and deletion of a monitoring target. The following description is based on the assumption that HUD 74 is projecting a virtual image. The driver checks a monitoring target frame in the virtual image projected by HUD 74. When wanting to update the monitoring target frame, the driver executes a gesture operation using a hand or finger in a range in which vehicle interior image sensor 72 can perform image capturing. Vehicle interior image sensor 72 captures an image of a gesture operation by the driver. The image capturing the gesture operation by the driver is a user input for updating the monitoring target frame included in the virtual image projected by HUD 74, and is also a user input for updating the monitoring target specified by monitoring target management unit 38. Vehicle interior image sensor 72 outputs the image to operation signal input unit 32. Operation signal input unit 32 outputs the image to monitoring target management unit 38.

Monitoring target management unit 38 receives the image from operation signal input unit 32. Monitoring target management unit 38 specifies a position of a finger included in the image. The position of the finger may also be specified by executing the same processing as object detection processing for an image described above. Monitoring target management unit 38 specifies the gesture operation by following a change in the specified position of the finger. On the other hand, monitoring target management unit 38 determines in advance a gesture operation for adding a monitoring target and a gesture operation for deleting a monitoring target. If a specified gesture operation coincides with the gesture operation determined in advance for adding a monitoring target, monitoring target management unit 38 adds an object included in the information from information input unit 80 as a monitoring target.

More specifically, monitoring target management unit 38 specifies a direction indicated by a gesture operation. For example, referring to FIG. 5, a direction of an axis extending from eye 302 to finger 304 is a specified direction. In addition, monitoring target management unit 38 specifies an object existing in the specified direction based on information from information input unit 80. A known technique may be used to specify such objects, and hence a description of the technique will be omitted. In addition, monitoring target management unit 38 adds a specified object as a monitoring target. The object specified in this case is an object in a real space. In addition, monitoring target management unit 38 starts tracking the added monitoring target in the same manner as described above. This processing can be regarded as processing of adding a monitoring target upon receiving a gesture operation that is determined in advance to add a monitoring target and corresponds to a target existing in a real space.

If a specified gesture operation is a gesture operation determined in advance to delete a monitoring target, monitoring target management unit 38 deletes the object, as a monitoring target, indicated by the gesture operation. Monitoring target management unit 38 specifies a direction indicated by the gesture operation. In addition, monitoring target management unit 38 deletes a monitoring target existing in the specified direction. In addition, monitoring target management unit 38 finishes tracking the deleted monitoring target. This processing can be regarded as processing of deleting a monitoring target upon receiving a user input determined in advance to delete a monitoring target.

Note that a user input is not limited to a gesture operation. The driver checks a monitoring target frame in the virtual image projected by HUD 74. When wanting to update a monitoring target frame, the driver points at one point in a range in which vehicle interior image sensor 72 can perform image capturing. Vehicle interior image sensor 72 captures an image of a pointing operation of the driver. The image capturing the pointing operation of the driver is a user input for updating a monitoring target frame included in a virtual image projected by HUD 74 and is also a user input for updating a monitoring target specified by monitoring target management unit 38. Vehicle interior image sensor 72 outputs the image to operation signal input unit 32. Operation signal input unit 32 outputs the image to monitoring target management unit 38.

Monitoring target management unit 38 receives the image from operation signal input unit 32. Monitoring target management unit 38 specifies a position of a finger included in the image. The position of the finger may also be specified by executing the same processing as object detection processing for an image described above. Monitoring target management unit 38 determines whether the specified finger position is located outside or inside the monitoring target frame. More specifically, monitoring target management unit 38 determines whether an axis extending through the finger position from the eye position is located outside or inside the monitoring target frame.

If the selected position is located outside the monitoring target frame, monitoring target management unit 38 adds the target indicated by the user input as a monitoring target. This processing can be regarded as processing of, upon receiving a user input with respect to a target that is different from a monitoring target frame highlighted by display controller 40 and exists in a real space, adding the target indicated by the user input as a monitoring target. In contrast, if the selected position is located inside the monitoring target frame, monitoring target management unit 38 deletes the monitoring target in accordance with the user input. Note that in this case as well, monitoring target management unit 38 may execute re-learning. In addition, monitoring target management unit 38 may determine, in accordance with a gesture operation and a pointing operation, whether to execute re-learning.

Figure 6A:
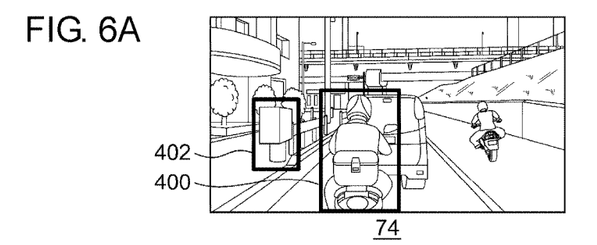
FIG. 6A is a view showing an image displayed on a HUD in FIG. 4.
Figure 6B:
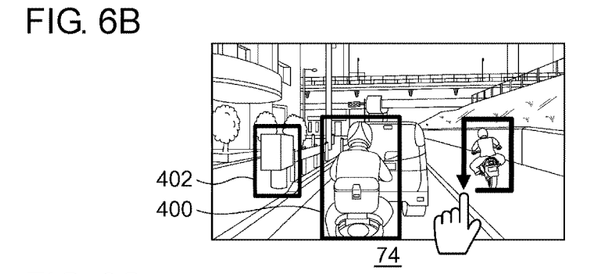
FIG. 6B is a view showing an image displayed on the HUD in FIG. 4.
Figure 6C:
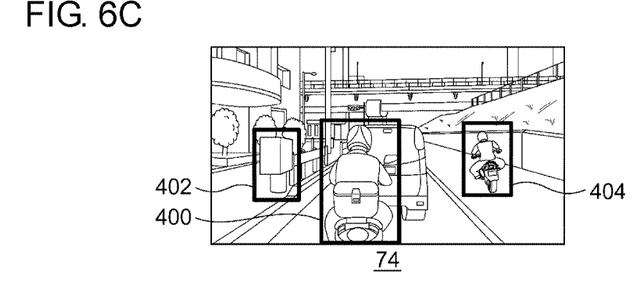
FIG. 6C is a view showing an image displayed on the HUD in FIG. 4.

FIGS. 6A to 6F show images displayed on HUD 74. These images correspond to a field of view of a driver who is looking ahead of vehicle 100 through a windshield. Referring to FIG. 6A, first monitoring target frame 400 and second monitoring target frame 402 are projected. Referring to FIG. 6B, when the driver has performed a gesture operation of surrounding a target outside first monitoring target frame 400 and second monitoring target frame 402, monitoring target management unit 38 adds the surrounded target in a real space as a monitoring target. Referring to FIG. 6C, the added monitoring target is referred to as third monitoring target frame 404. In this case, when a surrounding gesture operation is determined as a gesture for permanently adding a monitoring target, monitoring target management unit 38 starts tracking third monitoring target frame 404 and executes re-learning.

Figure 6D:
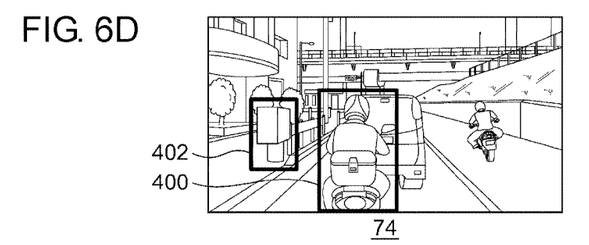
FIG. 6D is a view showing an image displayed on the HUD in FIG. 4.
Figure 6E:
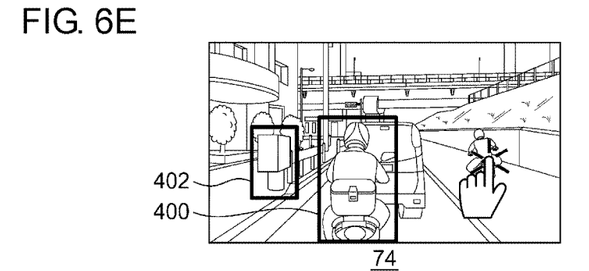
FIG. 6E is a view showing an image displayed on the HUD in FIG. 4.
Figure 6F:
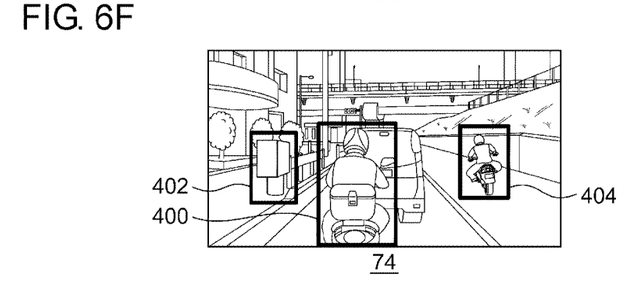
FIG. 6F is a view showing an image displayed on the HUD in FIG. 4.

FIG. 6D is shown similarly to FIG. 6A. Referring to FIG. 6E, when the driver indicates a position outside first monitoring target frame 400 and second monitoring target frame 402, that is, when the driver performs a gesture operation of touching, monitoring target management unit 38 adds a touched target in a real space as a monitoring target. Similar to FIG. 6C, FIG. 6F shows the added monitoring target as third monitoring target frame 404. In this case, when a touch is determined as a gesture of temporarily adding a monitoring target, monitoring target management unit 38 starts tracking third monitoring target frame 404 but does not execute re-learning.

Figure 7A:
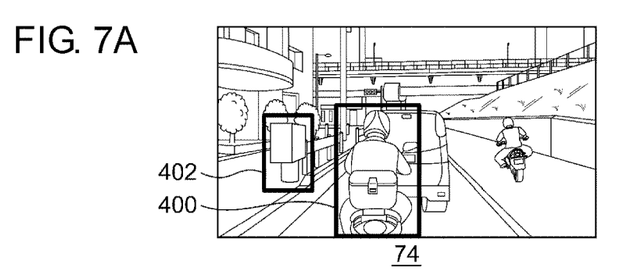
FIG. 7A is a view showing another image displayed on the HUD in FIG. 4.
Figure 7B:
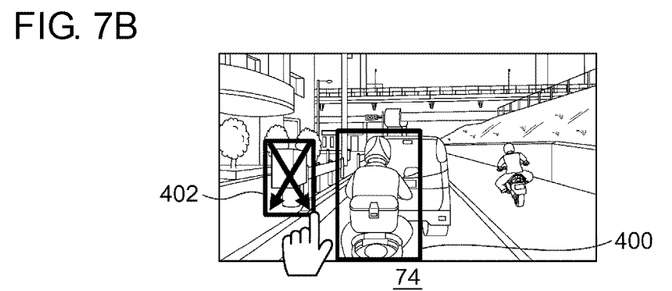
FIG. 7B is a view showing another image displayed on the HUD in FIG. 4.
Figure 7C:
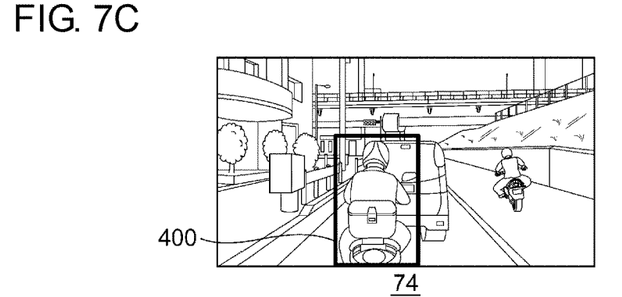
FIG. 7C is a view showing another image displayed on the HUD in FIG. 4.

FIGS. 7A to 7F each show another image displayed on HUD 74. These images also correspond to a field of view of a driver who is looking ahead of vehicle 100 through a windshield. FIG. 7A is shown similarly to FIG. 6A. Referring to FIG. 7B, when the driver performs a gesture operation of drawing an x mark in second monitoring target frame 402, monitoring target management unit 38 deletes second monitoring target frame 402 as a monitoring target in which the x mark is drawn. FIG. 7C shows only first monitoring target frame 400, with second monitoring target frame 402 being deleted. In this case, when a gesture operation of drawing an x mark is determined as a gesture of permanently adding a monitoring target, monitoring target management unit 38 finishes tracking second monitoring target frame 402 and executes re-learning.

Figure 7D:
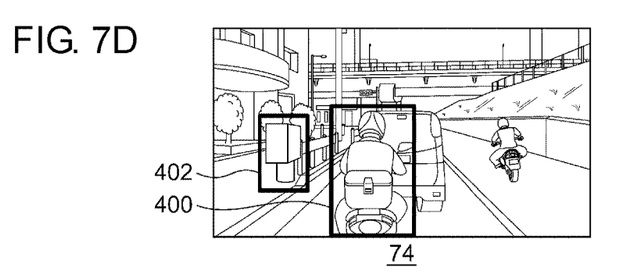
FIG. 7D is a view showing another image displayed on the HUD in FIG. 4.
Figure 7E:
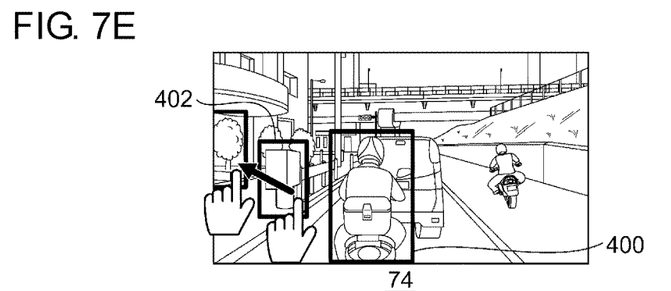
FIG. 7E is a view showing another image displayed on the HUD in FIG. 4.
Figure 7F:
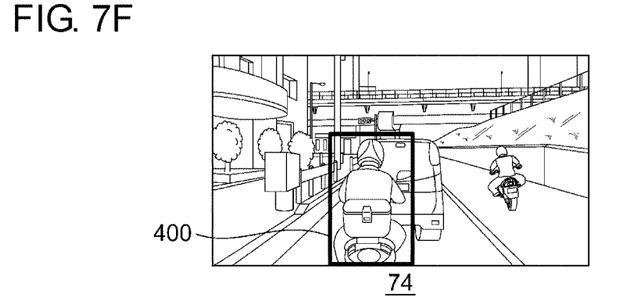
FIG. 7F is a view showing another image displayed on the HUD in FIG. 4.

FIG. 7D is shown similarly to FIG. 7A. Referring to FIG. 7E, when the driver performs a gesture operation of swiping in second monitoring target frame 402, monitoring target management unit 38 deletes swiped second monitoring target frame 402 as a monitoring target. FIG. 7F is shown similarly to FIG. 7C. In addition, in this case, when a gesture operation of swiping is determined as a gesture of temporarily adding a monitoring target, monitoring target management unit 38 finishes tracking second monitoring target frame 402 but does not execute re-learning.

Figure 8:
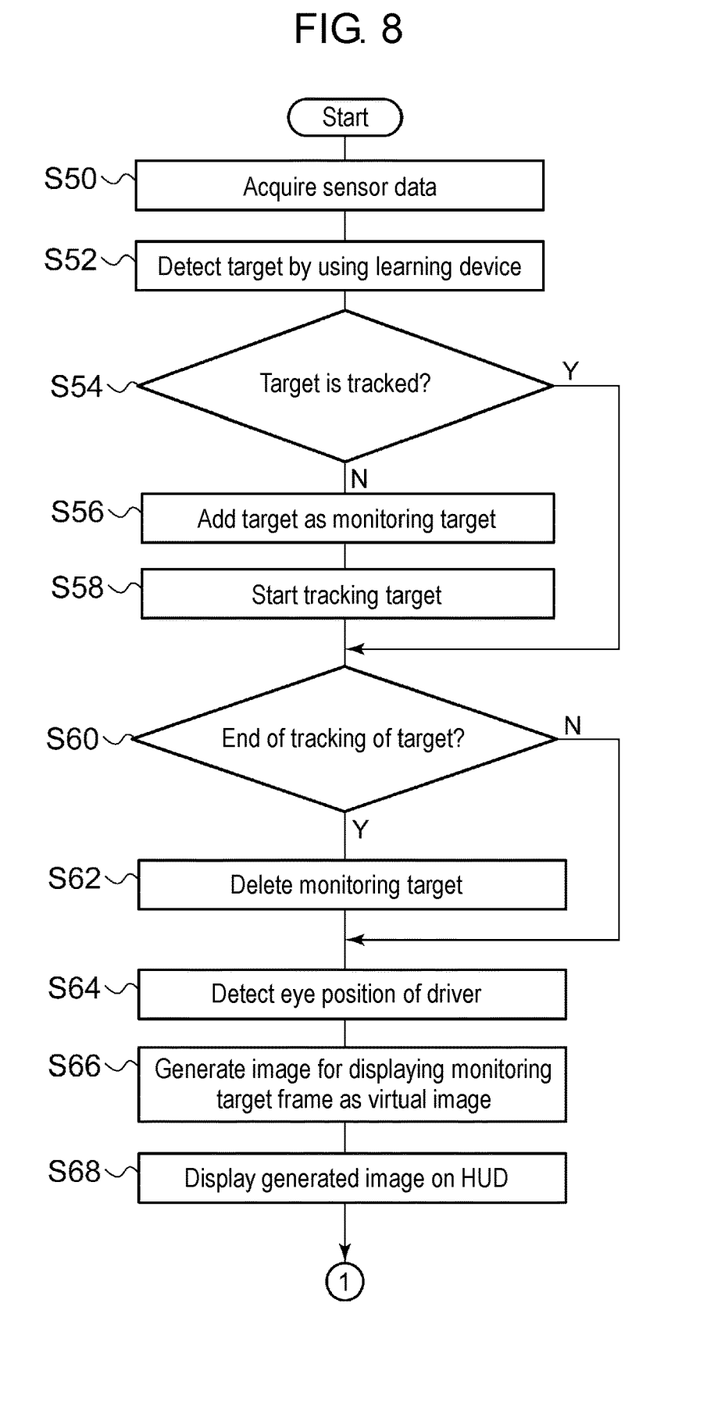
FIG. 8 is a flowchart showing a processing procedure for a monitoring target by a driving assistance device in FIG. 4.

An operation of driving assistance device 10 having the above configuration will be described. FIG. 8 is a flowchart showing a processing procedure for a monitoring target by driving assistance device 10. Information input unit 80 acquires sensor data (S50). Monitoring target management unit 38 detects a target by using a learning device (S52). If the target is not tracked (N in S54), monitoring target management unit 38 adds the target as a monitoring target (S56), and starts tracking the target (S58).

In contrast, if the target is tracked (Y in S54), the process skips steps 56 and 58. If tracking of the target is finished (Y in S60), monitoring target management unit 38 deletes the monitoring target (S62). In contrast, if tracking of the target is not finished (N in S60), the process skips step 62. Monitoring target management unit 38 detects an eye position of the driver (S64). Monitoring target management unit 38 generates an image for displaying a monitoring target frame as a virtual image (S66). Display controller 40 causes HUD 74 to display the generated image (S68).

Figure 9:
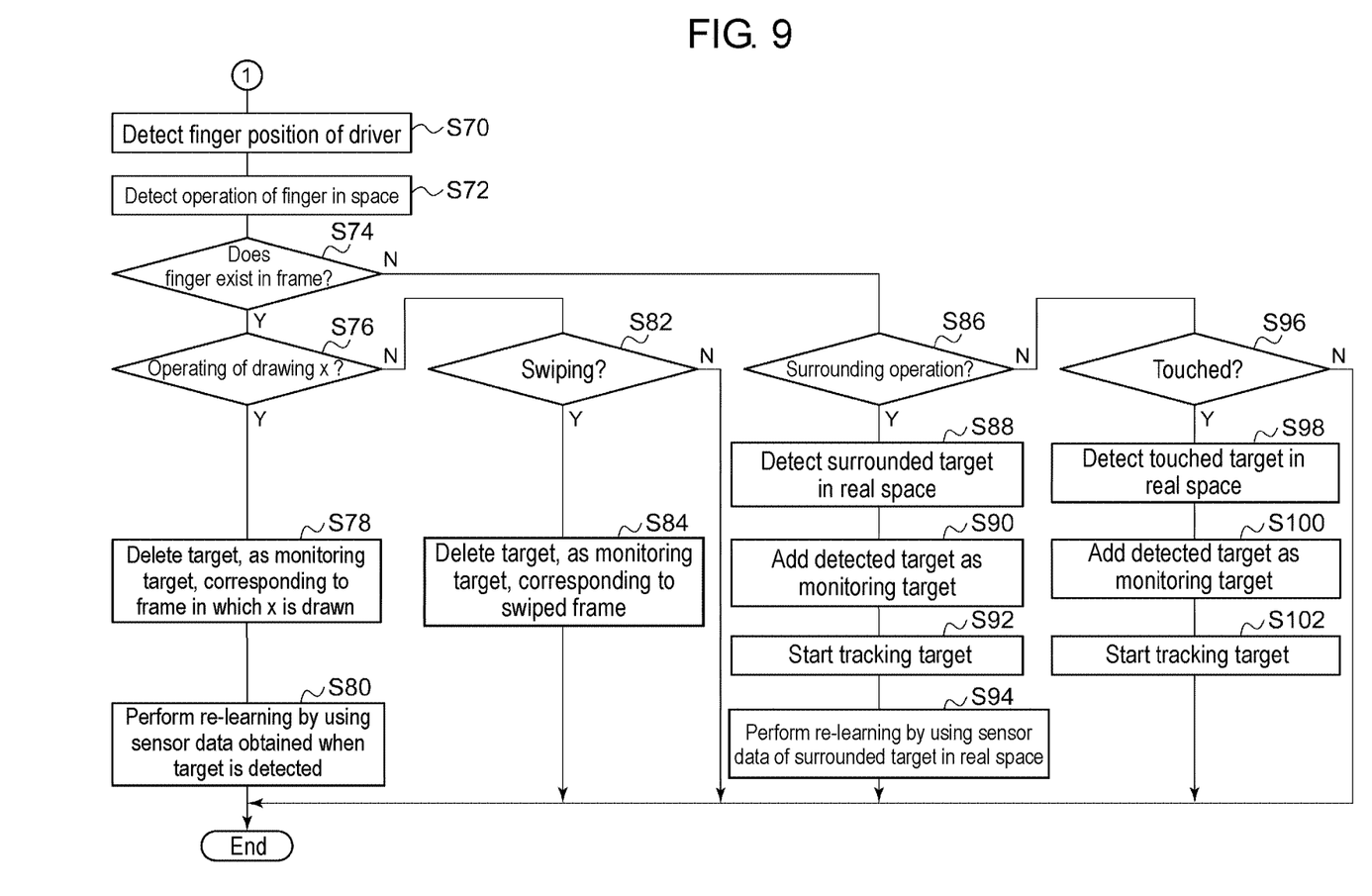
FIG. 9 is a flowchart showing a next processing procedure for a monitoring target by a driving assistance device in FIG. 4.

FIG. 9 is a flowchart showing a next processing procedure for a monitoring target by driving assistance device 10. This flowchart shows processing following the processing shown in FIG. 8. Monitoring target management unit 38 detects a finger position of the driver (S70), and detects an operation of the finger in a space (S72). If the finger exists in a frame (Y in S74) and an operation of drawing "x" is detected (Y in S76), monitoring target management unit 38 deletes a target, as a monitoring target, corresponding to the frame in which "x" is drawn (S78), and performs re-learning by using sensor data obtained when the target is detected (S80). If the detected operation is not an operation of drawing "x" (N in S76) but is a swiping operation (Y in S82), monitoring target management unit 38 deletes a target, as a monitoring target, corresponding to the swiped frame (S84). If the operation is not a swiping operation (N in S82), the processing is terminated.

If the finger does not exist in the frame, that is, exists outside the frame (N in S74), and a surrounding operation is detected (Y in S86), monitoring target management unit 38 detects a surrounded target in a real space (S88), and adds the detected target as a monitoring target (S90). Monitoring target management unit 38 starts tracking the target (S92), and performs re-learning by using sensor data of the surrounded target in a real space (S94). If the operation is not a surrounding operation (N in S86) but is a touch (Y in S96), monitoring target management unit 38 detects the touched target in the real space (S98), and adds the detected target as a monitoring target (S100). Monitoring target management unit 38 starts tracking the target (S102). If the operation is not a touch (N in S96), the processing is terminated.

This exemplary embodiment is configured to add a monitoring target upon receiving a user input with respect to a different target from a highlighted monitoring target, and hence can set a monitoring target reflecting a will of the driver. Upon receiving a user input of a gesture operation determined in advance to add a monitoring target, the exemplary embodiment is configured to add a monitoring target. This makes it possible to clearly input a will of the driver. Upon receiving a user input with respect to a target existing in a real space, the exemplary embodiment is configured to add a monitoring target. This makes it possible to easily issue an instruction. The exemplary embodiment is configured to determine, in accordance with a gesture operation, whether to perform re-learning, and hence can improve convenience. Re-learning a monitoring target can improve the peripheral detection performance. Upon receiving a user input with respect to a highlighted monitoring target, the exemplary embodiment is configured to delete the monitoring target. This makes it possible to set a monitoring target reflecting a will of the driver. In addition, upon receiving a user input of a gesture operation determined in advance to delete a monitoring target, the exemplary embodiment configured to delete the monitoring target. This makes it possible to clearly input a will of the driver.

The present invention has been described with reference to exemplary embodiments. Those skilled in the art should understand that these exemplary embodiments are examples, and various modifications can be made to combinations of constituent elements and processing processes of the exemplary embodiments and are included in the scope of the present invention.

The following is an outline of an aspect of the present invention. A driving assistance device according to an aspect of the present invention includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit updates a monitoring target when the input unit receives a user input.

According to this aspect, a monitoring target is specified based on vehicle peripheral information acquired from the sensor, and when a user input for updating a monitoring target is received with respect to a highlighted monitoring target, the monitoring target is updated. This makes it possible to set a monitoring target reflecting a will of the driver.

Another aspect of the present invention also relates to a driving assistance device. This device includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit adds a monitoring target when the input unit receives a user input.

According to this aspect, a monitoring target is specified based on vehicle peripheral information acquired from the sensor, and when a user input for updating a monitoring target is received with respect to a highlighted monitoring target, the monitoring target is added. This makes it possible to set a monitoring target reflecting a will of the driver.

Upon receiving a user input with respect to a different target from a monitoring target highlighted by the display controller, the monitoring target management unit may add the target indicated by the user input as a monitoring target. In this case, upon receiving a user input with respect to a different target from a highlighted monitoring target, the monitoring target management unit adds a monitoring target. This makes it possible to clearly input a will of the driver.

Upon receiving a user input with respect to a different target from a monitoring target highlighted by the display controller and displayed on the display unit, the monitoring target management unit may add a monitoring target. In this case, upon receiving a user input with respect to a target displayed on the display unit, the monitoring target management unit adds a monitoring target. This makes it possible to easily issue an instruction.

Upon receiving a user input with respect to a different target from a monitoring target highlighted by the display controller and existing in a real space, the monitoring target management unit may add a monitoring target. In this case, upon receiving a user input with respect to a target existing in a real space, the monitoring target management unit adds a monitoring target. This makes it possible to easily issue an instruction.

Upon receiving a user input determined in advance to add a monitoring target, the monitoring target management unit may add the target indicated by the user input as a monitoring target. In this case, upon receiving a user input determined in advance to add a monitoring target, the monitoring target management unit adds a monitoring target. This makes it possible to clearly input a will of the driver.

Upon receiving a user input determined in advance to add a monitoring target and with respect to a target displayed on the display unit, the monitoring target management unit may add a monitoring target. In this case, upon receiving a user input with respect to a target displayed on the display unit, the monitoring target management unit adds a monitoring target. This makes it possible to easily issue an instruction.

Upon receiving a user input determined in advance to add a monitoring target and with respect to a target existing in a real space, the monitoring target management unit may add a monitoring target. In this case, upon receiving a user input with respect to a target existing in a real space, the monitoring target management unit adds a monitoring target. This makes it possible to easily issue an instruction.

Still another aspect of the present invention also relates to a driving assistance device. This device includes a monitoring target management unit configured to specify a monitoring target based on vehicle peripheral information acquired from a sensor mounted on a vehicle, a display controller configured to highlight the monitoring target specified by the monitoring target management unit, and an input unit configured to receive a user input for updating the monitoring target specified by the monitoring target management unit. The monitoring target management unit deletes a monitoring target when the input unit receives a user input.

According to this aspect, a monitoring target is specified based on vehicle peripheral information acquired from the sensor, and when a user input for updating a monitoring target is received with respect to a highlighted monitoring target, the monitoring target is deleted. This makes it possible to set a monitoring target reflecting a will of the driver.

Upon receiving a user input with respect to a monitoring target highlighted by the display controller, the monitoring target management unit may delete the monitoring target. In this case, upon receiving a user input with respect to a highlighted monitoring target, the monitoring target management unit deletes the monitoring target. This makes it possible to clearly input a will of the driver.

Upon receiving a user input determined in advance to delete a monitoring target, the monitoring target management unit may delete the monitoring target. In this case, upon receiving a user input determined in advance to delete a monitoring target, the monitoring target management unit deletes the monitoring target. This makes it possible to clearly input a will of the driver.

The monitoring target management unit holds information concerning a compulsory monitoring target. Even when the input unit receives a user input, the monitoring target management unit may make deletion of the compulsory monitoring target non-executable. In this case, because the monitoring target management unit keeps maintaining a monitoring target regardless of a user input, it is possible to ensure safety of driving.

The monitoring target management unit may update a criterion for specifying a monitoring target based on vehicle peripheral information in accordance with a user input received by the input unit. In this case, because the monitoring target management unit updates a criterion for specifying a monitoring target based on vehicle peripheral information, it is possible to improve specifying accuracy with respect to a monitoring target.

The sensor may include at least one of a camera, a millimeter wave, and a laser.

Still another aspect of the present invention also relates to a driving assistance method. This method includes a step of specifying a monitoring target based on vehicle peripheral information acquired by a sensor mounted on a vehicle, a step of highlighting the specified monitoring target, a step of receiving a user input for updating the specified monitoring target, and a step of updating the monitoring target upon reception of the user input.

Each of the first and second exemplary embodiments has exemplified driving assistance device 10 implemented by a dedicated LSI. However, a function of driving assistance device 10 may be implemented by using a central processing unit (CPU) in a portable device such as a smartphone or tablet used as display device 14. In this case, a portable device used as display device 14 is directly connected to automatic driving control device 16. In addition, the function of driving assistance device 10 may be implemented by a CPU in a car navigation device or a head unit such as a display audio system. Furthermore, a dedicated LSI that implements driving assistance device 10 may be included in a head unit. This modification can improve a degree of freedom in configuration.

In each of the first and second exemplary embodiments, monitoring target management unit 38 deletes a monitoring target in accordance with a user input. However, monitoring target management unit 38 is not limited to this configuration and may be configured to hold information concerning a compulsory monitoring target. As an example, monitoring target management unit 38 holds information concerning an emergency vehicle as information concerning a compulsory monitoring target. Monitoring target management unit 38 may also configured to make deletion of a compulsory monitoring target non-executable even upon receiving a user input. This modification can ensure safety of driving of vehicle 100 because an emergency vehicle or the like is maintained as a monitoring target regardless of a user input.

Vehicle exterior image sensor 12 in the first exemplary embodiment and millimeter-wave radar 70 in the second exemplary embodiment are used as sensors for acquiring vehicle peripheral information. However, they are not exhaustive, and at least one of the following may be used as a sensor: a light detection and ranging laser, laser imaging detection and ranging (LIDAR), a sonar, and a laser. In addition, millimeter-wave radar 70 and vehicle interior image sensor 72 may be used in the first exemplary embodiment, and vehicle exterior image sensor 12 may be used in the second exemplary embodiment. Furthermore, a plurality of sensors may be combined. This modification can improve a degree of freedom in configuration. Note that information acquired from the sensor is vehicle peripheral information.

INDUSTRIAL APPLICABILITY

Present disclosure is effective in updating a monitoring target.

REFERENCE MARKS IN THE DRAWINGS 10 driving assistance device
12 vehicle exterior image sensor
14 display device
16 automatic driving control device
20 I/O unit
22 processor
30 image input unit
32 operation signal input unit
34 image output unit
36 monitoring result output unit
38 monitoring target management unit
40 display controller
42 monitoring unit
50 display unit
52 operation unit
60 I/O unit
62 processor
100 vehicle

The invention claimed is:

1. A driving assistance device comprising:
at least one processor; and
at least one memory device storing at least one program that, when executed by the at least one processor, causes the driving assistance device to:
specify a monitoring target based on vehicle peripheral information acquired from a sensor mounted on a vehicle;
highlight the monitoring target; and
receive a user input for updating the monitoring target,
wherein the monitoring target is deleted in a case where the user input is received, and
the at least one memory device stores information concerning a compulsory monitoring target and makes deletion of the monitoring target non-executable in a case where the user input is received and the monitoring target is the compulsory monitoring target.

2. The driving assistance device according to claim 1, wherein upon receiving a user input with respect to the monitoring target that is highlighted the monitoring target that is highlighted is deleted after reception of the user input with respect to the monitoring target that is highlighted.

3. The driving assistance device according to claim 1, wherein upon receiving a user input determined in advance to delete the monitoring target, the monitoring target is deleted.

4. The driving assistance device according to claim 1, wherein a criterion for specifying the monitoring target is updated based on the vehicle peripheral information in accordance with the user input.

5. The driving assistance device according to claim 1, wherein the sensor includes a camera, a millimeter wave device, or a laser.

6. A driving assistance method comprising:
specifying a monitoring target based on the vehicle peripheral information acquired by from a sensor mounted on a vehicle;
highlighting the monitoring target;
receiving a user input for updating the monitoring target;
deleting the monitoring target upon reception of the user input;
storing information concerning a compulsory monitoring target; and
making deletion of the monitoring target non-executable in a case where the user input is received and the monitoring target is the compulsory monitoring target.

7. A non-transitory computer-readable medium storing a program that, when executed by a processor of a computer, causes the computer to:
specify a monitoring target based on vehicle peripheral information acquired from a sensor mounted on a vehicle;
highlight the monitoring target;
receive a user input for updating the monitoring target;
delete the monitoring target upon reception of the user input;
store information concerning a compulsory monitoring target; and make deletion of the monitoring target non-executable in a case where the user input is received and the monitoring target is the compulsory monitoring target.

\* \* \* \* \*